United States Patent
Li et al.

(10) Patent No.: US 11,886,832 B2
(45) Date of Patent: Jan. 30, 2024

(54) OPERATION DEVICE AND OPERATION METHOD

(71) Applicant: Xiamen SigmaStar Technology Ltd., Fujian (CN)

(72) Inventors: Xiaofeng Li, Fujian (CN); Chengwei Zheng, Fujian (CN); Bo Lin, Fujian (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 489 days.

(21) Appl. No.: 17/134,660

(22) Filed: Dec. 28, 2020

(65) Prior Publication Data

US 2021/0224033 A1 Jul. 22, 2021

(30) Foreign Application Priority Data

Jan. 21, 2020 (CN) .......................... 202010072697.9

(51) Int. Cl.
*G06F 7/483* (2006.01)
*G06F 17/15* (2006.01)
*G06F 7/544* (2006.01)

(52) U.S. Cl.
CPC ............ *G06F 7/483* (2013.01); *G06F 7/5443* (2013.01); *G06F 17/15* (2013.01)

(58) Field of Classification Search
CPC ............ G06N 3/02; G06N 3/04; G06N 3/045; G06N 3/0464; G06N 3/0495; G06N 3/063; G06F 7/5443; G06F 7/483; G06F 17/10; G06F 17/15–153; G06F 2207/4824; H03M 7/24
See application file for complete search history.

(56) References Cited

U.S. PATENT DOCUMENTS

| 9,912,349 | B1* | 3/2018 | Ouyang | ................... H03M 7/30 |
| 11,630,982 | B1* | 4/2023 | Hsu | ........................... G06N 3/04 706/22 |
| 2019/0012559 | A1* | 1/2019 | Desappan | .............. G06V 10/28 |
| 2019/0294413 | A1* | 9/2019 | Vantrease | ............. G06F 7/5095 |
| 2020/0167632 | A1* | 5/2020 | Kim | ....................... G06F 7/4876 |

(Continued)

OTHER PUBLICATIONS

Bhandare, Aishwarya, et al. "Efficient 8-Bit Quantization of Transformer Neural Machine Language Translation Model." arXiv.Org, Jun. 7, 2019, arxiv.org/abs/1906.00532. (Year: 2019).*

(Continued)

*Primary Examiner* — Matthew D Sandifer
*Assistant Examiner* — Huy Duong
(74) *Attorney, Agent, or Firm* — Edell, Shapiro & Finnan, LLC

(57) ABSTRACT

An operation device includes a quantizer circuit, a buffer circuit, a convolution core circuit and a multiply-add circuit. The quantizer circuit receives first feature data and performs asymmetric uniform quantization on the first feature data to obtain and store in the buffer circuit second feature data. The quantizer circuit further receives a first weighting coefficient and performs symmetric uniform quantization on the first weighting coefficient to obtain and store in the buffer circuit a second weight coefficient. The convolution core circuit performs a convolution operation on the initial operation result, an actual quantization scale factor and an actual bias value to obtain a final operation result.

6 Claims, 3 Drawing Sheets

(56) References Cited

U.S. PATENT DOCUMENTS

| | | | |
|---|---|---|---|
| 2021/0133278 A1* | 5/2021 | Fang | G06N 3/02 |
| 2021/0157549 A1* | 5/2021 | Elmer | G06N 3/045 |
| 2021/0218414 A1* | 7/2021 | Malhotra | G06N 5/046 |
| 2021/0248456 A1* | 8/2021 | Guo | G06N 3/045 |
| 2022/0114413 A1* | 4/2022 | Qi | G06N 3/045 |

OTHER PUBLICATIONS

Wu, Hao, et al. "Integer Quantization for Deep Learning Inference: Principles and Empirical Evaluation." arXiv.Org, Apr. 20, 2020, arxiv.org/abs/2004.09602. (Year: 2020).*

* cited by examiner

OPERATION DEVICE AND OPERATION METHOD

This application claims the benefit of China application Serial No. CN202010072697.9, filed on Jan. 21, 2020, the subject matter of which is incorporated herein by reference.

BACKGROUND OF THE INVENTION

Field of the Invention

The invention relates the technical field of data operation, particularly to an operation device and an operation method, and more particularly to an operation device and an operation method applied to a convolutional neural network.

Description of the Related Art

Deep learning is one critical application technology for developing artificial intelligence, and is extensively applied in fields including computer imaging and voice recognition. Convolutional neural networking (CNN) is a deep learning efficient recognition technology that has drawn much attention in the recent years. It performs convolutional operations and vector operations of multiple layers with multiple feature filters by directly inputting original image or data, further generating highly accurate results in aspects of imaging and voice recognition. The scale of filters can range from small-block scales such as 1×1 and 3×3 to 5×5 and 7×7 or even 11×11 large-scale convolution operation blocks, and thus the convolution operation is also a quite performing-consuming operation.

In seek of classification accuracy, the depth as well as complexity of CNN models are ever-increasing; for example, the number of layers of a depth residual neural network (ResNet) is as many as 152 layers. In certain reality application scenarios such as mobile or embedded apparatuses, such enormous and complex models face problems of insufficient memory capacities and response delays; for example, horrendous consequences can be resulted if the response speed of a pedestrian detection system of an auto-driving vehicle has a slow response speed. Therefore, as it become difficult to implement large-scale CNN, CNN researches have been carried out in aim of developing small and efficient CNN models. For example, Google has proposed a small and efficient CNN model, MobileNet, which has a reduced model size while preserving model performance and at the same time improves model speed.

In contribution to featured outstanding performance, deep neural networks are commonly applied in diversified artificial intelligence apparatuses. In some apparatuses, in particular mobile apparatuses, available storage and operation resources are rather limited, and so how to increase the execution speed of neural networks using such limited available storage and operation resources has become especially significant.

However, to perform convolutional operation in an integrated circuit of an embedded apparatus and hence achieve high accuracy, a larger memory space is required for performing high-complexity operation, which results in higher costs and a larger chip area.

Therefore, there is a need for a convolution operation method and a chip using the method capable of reducing memory costs and chip area.

SUMMARY OF THE INVENTION

It is an object of the present invention to provide an operation device and an operation method for at least resolving one of technical problems of the prior art.

An operation device is provided according to an aspect of the present invention. The operation device includes a quantizer circuit, a buffer circuit, a control circuit, a convolution core circuit and a multiply-add circuit. The quantizer circuit receives first feature data and performs asymmetric uniform quantization on the first feature data to obtain second feature data and stores the same in the buffer circuit. The quantizer circuit further receives a first weighting coefficient and performs symmetric uniform quantization on the first weighting coefficient to obtain a second weight coefficient and stores the same in the buffer circuit. The convolution core circuit performs a convolution operation on the second feature data and the second weighting coefficient according to an instruction of the control circuit to obtain an initial operation result. The multiply-add circuit performs a multiply-add operation on the initial operation result, an actual quantization scale factor and an actual bias value to obtain a final operation result.

In some alternative embodiments, the operation device further includes an offline calculation circuit connected to the multiply-add circuit. The offline calculation circuit calculates an initial bias value, calculated items generated by a quantization parameter zero and the actual quantization scale factor, and merges the initial bias value and the calculated items generated by the quantization parameter zero to generate the actual bias value.

An operation method is provided according to another aspect of the present invention. The operation method includes: receiving first feature data and performing asymmetric uniform quantization on the first feature data to obtain second feature data; receiving a first weighting coefficient and performing symmetric uniform quantization on the first weighting coefficient to obtain a second weighting coefficient; performing a convolution operation on the second feature data and the second weighting coefficient according to an instruction to obtain an initial operation result; and performing a multiply-add operation on the initial operation result, an actual quantization scale factor and an actual bias value to obtain a final operation result.

In some alternative embodiments, the method further includes: offline calculating an initial bias value, some calculated items generated by a quantization parameter zero and the actual quantization scale factor; and merging the initial bias value and the calculated items generated by the quantization parameter zero to generate the actual bias value.

The operation device and operation method according to the embodiments of the present invention obtain the second feature data by performing asymmetric uniform quantization on the first feature data, and obtain the second weighting coefficient by performing symmetric uniform quantization on the first weighting coefficient. Thus, online calculation brought by the quantization parameter zero may be eliminated so that an online calculation amount is consistent when symmetric uniform quantization is used for both the second feature data and the second weighting coefficient. Moreover, since asymmetric uniform quantization is used for the second feature data of the present invention, precision is higher than that when symmetric uniform quantization is used for both the second feature data and the second weighting coefficient, and such effect becomes even more obvious for less significant bits.

DETAILED DESCRIPTION OF THE INVENTION

Details of the present invention are further given by way of specific embodiments with the accompanying drawings below for a person skilled in the art to better understand the technical solutions of the present invention.

Figure 1:
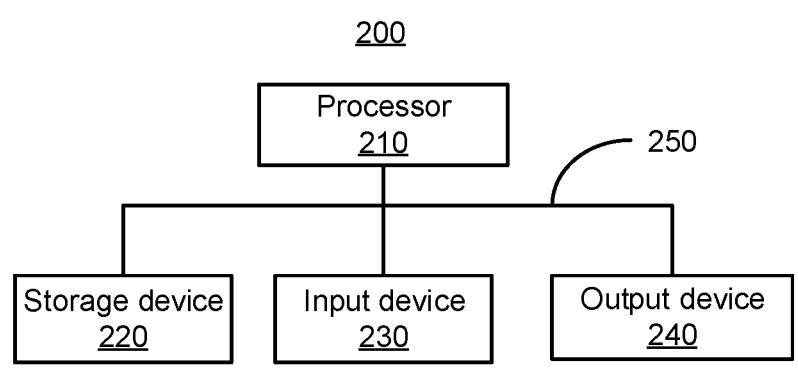
FIG. 1 is a schematic block diagram of an electronic apparatus according to a first embodiment of the present invention.

FIG. 1 shows an exemplary electronic apparatus for implementing an operation device and an operation method according to embodiments of the present invention.

As shown in FIG. 1, an electronic apparatus 200 includes one or more processors 210, one or more storage devices 220, one or more input devices 230, and one or more output devices 240. These elements are connected to one another by means of a bus 250 and/or a connection mechanism of another form. It should be noted that, the elements and structures of the electronic apparatus shown in FIG. 1 are illustrative but not restrictive, and the electronic apparatus may include other elements and structures according to requirements.

The processor 210 may be a central processing unit (CPU) or a processing unit in another form and having data processing capabilities and/or instruction executing capabilities, and is capable of controlling other elements in the electronic apparatus 200 so as to perform expected functions.

The storage device 220 may include one or more computer program products. The storage device 220 may include various types of computer-readable storage media, for example, volatile memories and/or non-volatile memories. The volatile memory may include, for example, random access memories (RAM) and/or high-speed temporary memories (caches). The non-volatile memories may include, for example, read-only memories (ROM), hard drives and flash memories. One or more computer program instructions may be stored in the computer-readable storage medium, and the processor can run the program instruction(s) to realize client functions and/or other expected functions (implemented by the processor) in the following embodiments of the present invention. Various applications and various types of data, for example, various types of data used and/or generated by the application, may be further stored in the computer-readable storage medium.

The input device 230 may be an apparatus for the user to input an instruction, and may include one or more of a keyboard, a mouse, a microphone and a touch screen.

The output device 240 may output various signals (e.g., an image or an audio) to an exterior (e.g., a user), and may include one or more of a display and a speaker.

An operation device according to an embodiment of the present invention is described with reference to FIG. 2 below.

Figure 2:
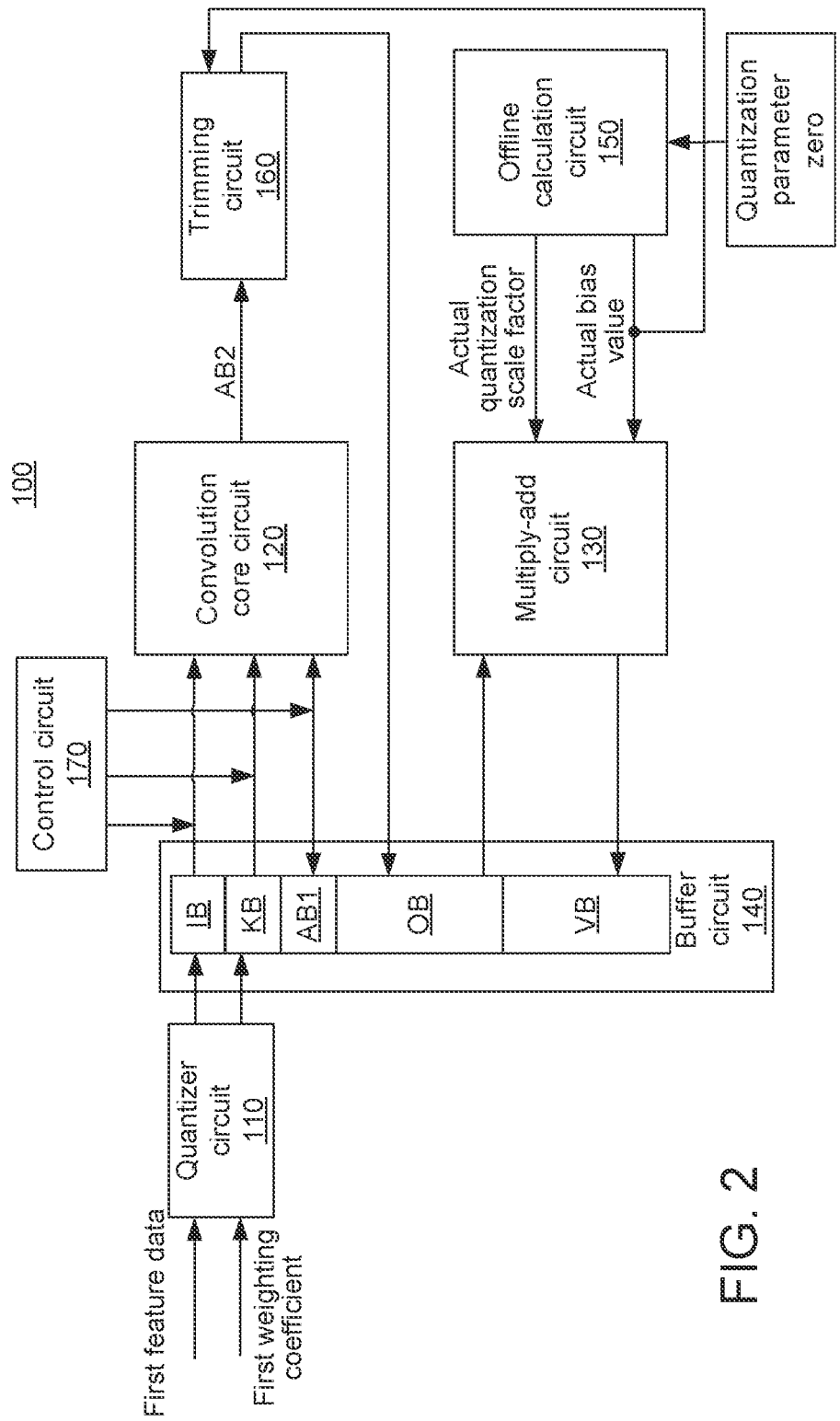
FIG. 2 is a structural schematic diagram of an operation device according to a second embodiment of the present invention.

As shown in FIG. 2, an operation device 100 includes a quantizer circuit 110, a convolution core circuit 120, a multiply-add circuit 130, a buffer circuit 140 and a control circuit 170. The quantizer circuit 110 receives first feature data, e.g., data of a feature map, and performs asymmetric uniform quantization on the first feature data to obtain and store in the buffer circuit 140 second feature data IB. The quantizer circuit 110 further receives a first weighting coefficient and performs symmetric uniform quantization on the first weighting coefficient to obtain and store in the buffer circuit 140 a second weighting coefficient KB. The convolution core circuit 120 performs a convolution operation on the second feature data IB and the second weighting coefficient KB according to an instruction of the control circuit 170 to obtain and store in the buffer circuit 140 an initial operation result AB1. The control circuit 170 is, for example, a central processing unit (CPU) or a control unit in another form and having data processing capabilities and/or instruction executing capabilities. The control circuit 170 may control which second weighting coefficients KB, which second feature data IB and which initial operation results AB1 are to be sent to the convolution core circuit 120, for the convolution core circuit 120 to perform calculation to obtain and store in the buffer circuit 140 a cumulative initial operation result AB2 having a first bit width, where AB2=AB1+KB*IB, and AB2 is a cumulative result. The multiply-add circuit 130 performs a multiply-add operation on the cumulative initial operation result AB2 having the first bit width, an actual quantization scale factor (scale) and an actual bias value (bias_comb) to obtain a final operation result VB, and stores the final operation result VB in the buffer circuit 140.

The operation device according to the embodiments of the present invention obtains the second feature data by performing asymmetric uniform quantization on the first feature data, and obtains the second weighting coefficient by performing symmetric uniform quantization on the first weighting coefficient. Thus, online calculation brought by the quantization parameter zero may be eliminated so that the amount of calculation is reduced, storing resource is saved and an online calculation amount is consistent when symmetric uniform quantization is used for both the second feature data and the second weighting coefficient. Moreover, since asymmetric uniform quantization is used for the second feature data of the present invention, precision is higher than that when symmetric uniform quantization is used for both the second feature data and the second weighting coefficient, and such effect becomes even more obvious for least significant bits.

For example, as shown in FIG. 2, the operation device 100 further includes an offline calculation circuit 150 that is connected to the multiply-add circuit 130. The offline calculation circuit 150 offline calculates an initial bias value, some calculated items generated by a quantization parameter zero and the actual quantization scale factor, and merges the initial bias value and the some calculated items generated by the quantization parameter zero to generate the actual bias value.

Specifically, the offline calculation circuit 150 first offline calculates a convolution initial bias value (bias) of neural network, some calculated items generated by the quantization parameter zero and the actual quantization scale factor (scale), and then merges the bias value and some calculated items generated by the quantization parameter zero to generate the actual bias value (bias_float).

In the operation device according to the embodiment of the present invention, the calculation processes of the initial bias value, some calculated items generated by the quantization parameter zero, the actual quantization scale factor and the actual bias value are all completed by offline calculation of the offline calculation circuit, so that an online calculation amount is reduced, and calculation can be performed using single precision floating point (FP32), which neither affects the online execution speed of convolution nor causes any precision loss.

It should be noted that, in addition to offline calculating associated parameters using single precision floating point by the offline calculation circuit 150, a person skilled in the art may also select other calculation tools for offline calculation according to actual requirements, and such details are not specifically limited by the embodiment of the present invention.

For example, as shown in FIG. 2, a trimming circuit 160 receives the initial operation result AB2 having the first bit width, trims the initial operation result AB2 having the first bit width to an initial operation result OB having a second bit width. The multiply-add circuit 130 performs a multiply-add operation on the initial operation result OB having the second bit width, the actual quantization scale factor and the actual bias value to obtain a final operation result VB, wherein the first bit width is larger than the second bit width.

The operation device according to this embodiment is capable of trimming the initial operation result having a larger bit width into the initial operation result having a smaller bit width by calculating the range of the initial operation result, that is, representing the initial operation result by a smaller bit width and preserving only more significant bits. Thus, given the same calculation resources, the operation device is provided with higher parallel calculation capabilities, storage resources are saved, the number of memory accesses is reduced, and execution efficiency of a network is enhanced. Moreover, performance loss is less because more significant bits of the initial operation result are preserved, and a space for storing the initial operation result having the second bit width can be reduced by trimming the initial operation result having the first bit width into the initial operation result having the second bit width.

For example, as shown in FIG. 2, the performing the multiply-add operation on the initial operation result having the second bit width, the actual quantization scale factor and the actual bias value to obtain the final operation result further includes the following.

The trimming circuit 160 further receives the actual bias value having the first bit width, and trims the actual bias value having the first bit width into an actual bias value having the second bit width. Then, the multiply-add circuit 130 performs a multiply-add operation on the initial operation result OB having the second bit width, the actual quantization scale factor and the actual bias value having the second bit width to obtain the final operation result VB.

The operation device according to this embodiment is capable of trimming the actual bias value having a larger bit width into having a smaller bit width by calculating the range of the initial operation result, that is, representing the actual bias value by a smaller bit width and preserving only more significant bits. Thus, given the same calculation resources, the operation device is provided with higher parallel calculation capabilities, storage resources are saved, the number of memory accesses is reduced, and execution efficiency of a network is enhanced. Moreover, performance loss is less because more significant bits of the actual bias value are preserved.

The structure of the multiply-add circuit 130 may include an adder and a multiplier, and the final operation result is calculated according to the following equation:

$$VB=(OB+\text{bias\_comb})*\text{scale}.$$

An operation method according to another embodiment of the present invention is described with reference to FIG. 3 below.

Figure 3:
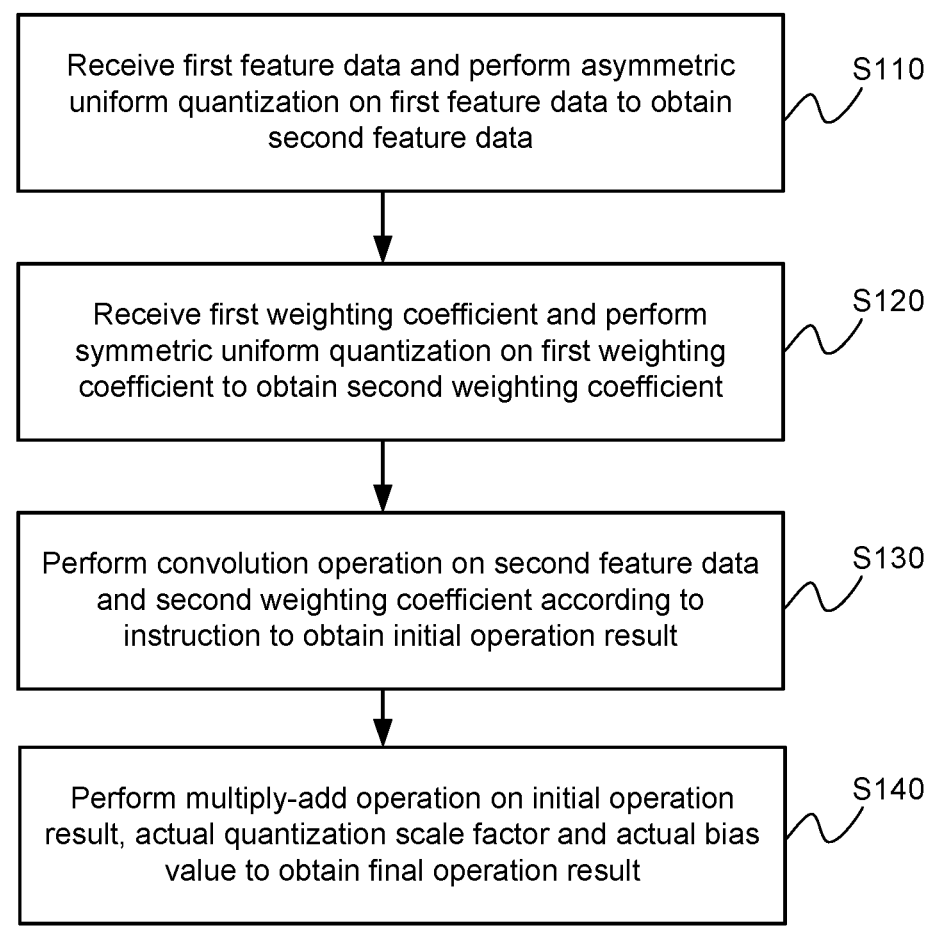
FIG. 3 is a flowchart diagram of an operation method according to a third embodiment of the present invention.

Referring to FIG. 3 showing an operation method S100, the operation method S100 may be implemented by the electronic apparatus in FIG. 1. Alternatively, the operation method S100 may be implemented by the operation device in FIG. 2 or as described above—associated details can be referred from the description above, and are omitted herein for brevity. The operation method S100 includes the following steps.

In step S110, first feature data is received and asymmetric uniform quantization is performed on the first feature data to obtain second feature data.

In step S120, a first weighting coefficient is received, and symmetric uniform quantization is performed on the first weighting coefficient to obtain a second weighting coefficient.

In step S130, a convolution operation is performed on the second feature data and the second weighting coefficient to obtain an initial operation result.

In step S140, a multiply-add operation is performed on the initial operation result, an actual quantization scale factor and an actual bias value to obtain a final operation result.

The operation method according to the embodiment of the present invention obtains the second feature data by performing asymmetric uniform quantization on the first feature data, and obtains the second weighting coefficient by performing symmetric uniform quantization on the first weighting coefficient. Thus, online calculation brought by the quantization parameter zero may be eliminated so that an online calculation amount is consistent when symmetric uniform quantization is used for both the second feature data and the second weighting coefficient. Moreover, since asymmetric uniform quantization is used for the second feature data of the present invention, precision is higher than that when symmetric uniform quantization is used for both the second feature data and the second weighting coefficient, and such effect becomes even more obvious for less significant bits.

For example, the operation method S100 further includes: offline calculating an initial bias value, some calculated items generated by a quantization parameter zero and the actual quantization scale factor, and merging the initial bias value and the some calculated items generated by the quantization parameter zero to generate the actual bias value.

In the operation method according to the embodiment of the present invention, the calculation processes of the initial bias value, some calculated items generated by the quantization parameter zero, the actual quantization scale factor and the actual bias value are all completed by offline calculation, so that an online calculation amount is reduced, and calculation can be performed using single precision floating point, which neither affects the online execution speed of convolution nor causes any precision loss.

For example, the performing the multiply-add operation on the initial operation result, the actual quantization scale factor and the actual bias value to obtain the final operation result further includes; receiving the initial operation result having a first bit width, and trimming the initial operation result having the first bit width into an initial operation result having a second bit width; and performing a multiply-add operation on the initial operation result having the second bit width, the actual quantization scale factor and the actual bias value to obtain the final operation result, wherein the first bit width is larger than the second bit width.

The operation method according to this embodiment is capable of trimming the initial operation result having a larger bit width into having a smaller bit width by calculating the range of the initial operation result, that is, representing the initial operation result by a smaller bit width and preserving only more significant bits. Thus, given the same calculation resources, the operation device is provided with higher parallel calculation capabilities, storage resources are saved, the number of memory accesses is reduced, and execution efficiency of a network is enhanced. Moreover, performance loss is less because more significant bits of the initial operation result are preserved, and a space for storing the initial operation result having the second bit width can be reduced by trimming the initial operation result having the first bit width into the initial operation result having the second bit width.

For example, the performing the multiply-add operation on the initial operation result having the second bit width, the actual quantization scale factor and the actual bias value to obtain the final operation result further includes: receiving the actual bias value having the first bit width, and trimming the actual bias value having the first bit width into an actual bias value having the second bit width; and performing a multiply-add operation on the initial operation result having the second bit width, the actual quantization scale factor and the actual bias value having the second bit width to obtain the final operation result.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. An operation device, embodied in an electronic apparatus, comprising a quantizer circuit, a buffer circuit, a control circuit, a convolution core circuit and a multiply-add circuit; wherein,
    the quantizer circuit receives first feature data and performs asymmetric uniform quantization on the first feature data to obtain and store in the buffer circuit second feature data, and receives a first weighting coefficient and performs symmetric uniform quantization on the first weighting coefficient to obtain and store in the buffer circuit a second weighting coefficient;
    the convolution core circuit performs a convolution operation on the second feature data and the second weighting coefficient according to an instruction of the control circuit to obtain an initial operation result;
    the multiply-add circuit performs a multiply-add operation on the initial operation result, an actual quantization scale factor and an actual bias value to obtain a final operation result; and
    a trimming circuit, receiving the initial operation result having a first bit width, and trimming the initial operation result having the first width into an initial operation result having a second bit width;
    wherein, the multiply-add circuit performs the multiply-add operation on the initial operation result having the second bit width, the actual quantization scale factor and the actual bias value to obtain the final operation result;
    wherein, the first bit width is larger than the second bit width,
    wherein the trimming circuit further receives the actual bias value having the first bit width, and trims the actual bias value having the first bit width into the actual bias value having the second bit width; the multiply-add circuit performs the multiply-add operation on the initial operation result having the second bit width, the actual quantization scale factor and the actual bias value having the second bit width to obtain the final operation result.

2. The operation device according to claim 1, further comprising:
    an offline calculation circuit, connected to the multiply-add circuit, offline calculating an initial bias value, calculated items generated by a quantization parameter zero, and the actual quantization scale factor, and merging the initial bias value and the calculated items generated by the quantization parameter zero to generate the actual bias value.

3. The operation device according to claim 2, wherein the offline calculation circuit offline calculates by using single precision floating point.

4. An operation method performed by an electronic apparatus, wherein the electronic apparatus comprising a quantizer circuit, a buffer circuit, a control circuit, a convolution core circuit and a multiply-add circuit; the operation method comprising:
    performing, by the quantizer circuit, asymmetric uniform quantization on first feature data to obtain and store in the buffer circuit second feature data;
    performing, by the quantizer circuit, symmetric uniform quantization on a first weighting coefficient to obtain and store in the buffer circuit a second weighting coefficient;
    performing, by the convolution core circuit, a convolution operation on the second feature data and the second weighting coefficient according to an instruction of the control circuit to obtain an initial operation result; and
    performing, by the multiply-add circuit, a multiply-add operation on the initial operation result, an actual quantization scale factor and an actual bias value to obtain a final operation result,
    wherein the step of performing the multiply-add operation on the initial operation result, the actual quantization scale factor and the actual bias value to obtain the final operation result comprises:
    receiving, by a trimming circuit, the initial operation result having a first bit width, and trimming, by the trimming circuit, the initial operation result having the first width into an initial operation result having a second bit width;
    performing, by the multiply-add circuit, the multiply-add operation on the initial operation result having the second bit width, the actual quantization scale factor and the actual bias value to obtain the final operation result;
    wherein, the first bit width is larger than the second bit width, and
    wherein the step of performing the multiply-add operation on the initial operation result having the second bit width, the actual quantization scale factor and the actual bias value to obtain the final operation result further comprises:
    receiving, by the trimming circuit, the actual bias value having the first bit width, and trimming, by the trimming circuit, the actual bias value having the first bit width into the actual bias value having the second width; and
    performing, by the multiply-add circuit, the multiply-add operation on the initial operation result having the second bit width, the actual quantization scale factor and the actual bias value having the second width to obtain the final operation result.

5. The operation method according to claim 4, further comprising:
   offline calculating an initial bias value, calculated items generated by a quantization parameter zero, and the actual quantization scale factor; and
   merging the initial bias value and the calculated items generated by the quantization parameter zero to generate the actual bias value.

6. The operation method according to claim 5, wherein the offline calculating is performed using single precision floating points.

* * * * *